United States Patent [19]
Holka

[11] 3,829,123
[45] Aug. 13, 1974

[54] SEAT BELT POSITIONER
[75] Inventor: Thomas C. Holka, Detroit, Mich.
[73] Assignee: Ford Motor Company, Dearborn, Mich.
[22] Filed: July 5, 1973
[21] Appl. No.: 376,764

[52] U.S. Cl. ............................ 280/150 SB, 297/389
[51] Int. Cl. ............................................ B60r 21/10
[58] Field of Search ....... 280/150 SB; 297/389, 388, 297/385

[56] References Cited
UNITED STATES PATENTS

| | | | |
|---|---|---|---|
| 3,418,021 | 12/1968 | Lewis | 297/389 X |
| 3,439,932 | 4/1969 | Lewis et al. | 297/389 X |
| 3,545,788 | 12/1970 | Brawner et al. | 280/150 SB |
| 3,583,764 | 6/1971 | Lohr et al. | 280/150 SB |
| 3,620,569 | 11/1971 | Mathis | 297/389 X |
| 3,679,229 | 7/1972 | Weststrate | 297/388 X |
| 3,749,418 | 7/1973 | Fancy | 280/150 SB |

*Primary Examiner*—Stanley H. Tollberg
*Assistant Examiner*—John P. Shannon
*Attorney, Agent, or Firm*—K. L. Zerschling; J. J. Roethel

[57] ABSTRACT

A shoulder harness coupled at its upper end to an anchor means located on a vehicle body roof side rail above and rearwardly of a vehicle seat assembly, the latter having a forwardly tiltable backrest structure. The shoulder harness in non-passenger restraining condition extends downwardly and forwardly from the anchor means across the space behind the backrest structure to an anchor means in juxtaposition to the outboard side of the seat cushion structure and interferes with access to the vehicle body space behind the seat assembly. A lift means carried on the backrest structure underlies the shoulder harness means. A drive means responsive to forward tilting movement of the backrest structure is operative to raise the lift means and thereby the shoulder harness toward the roof side rail into an extended substantially parallel relationship to the latter out of interference with access to the vehicle body space behind the seat assembly.

8 Claims, 4 Drawing Figures

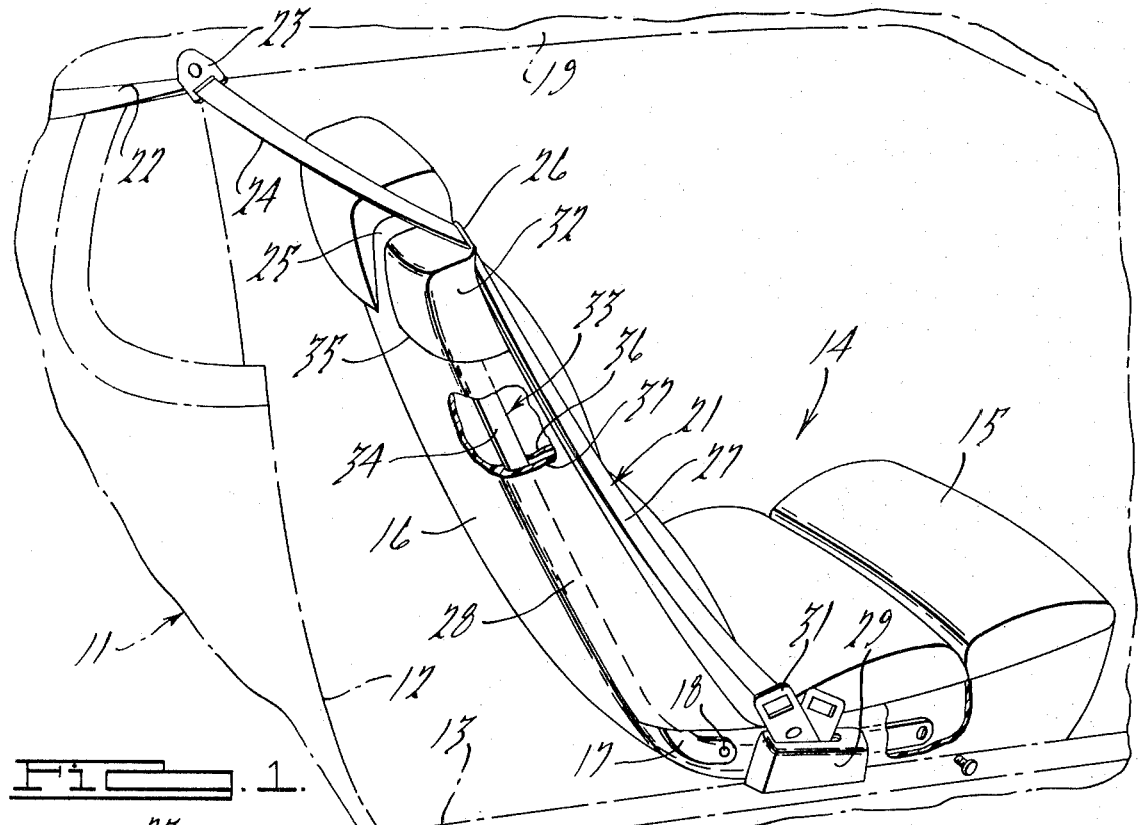
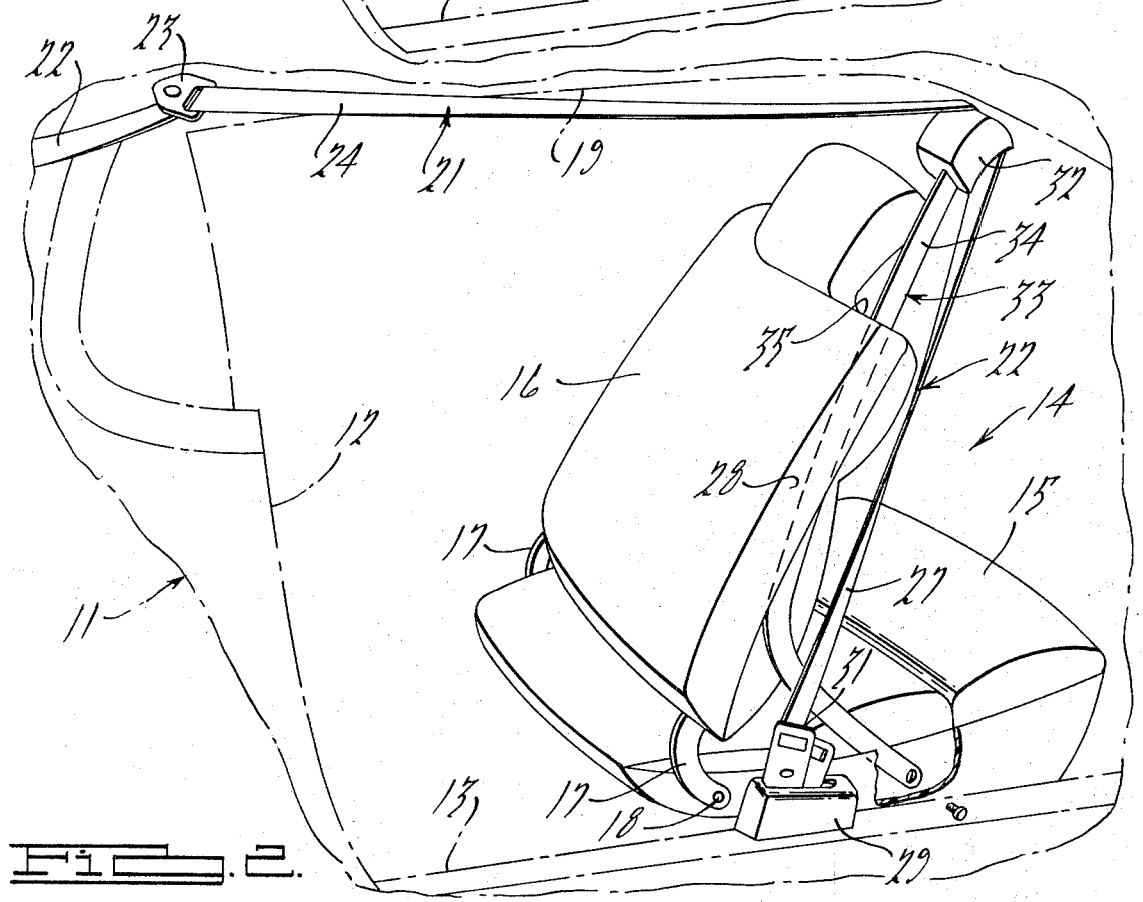

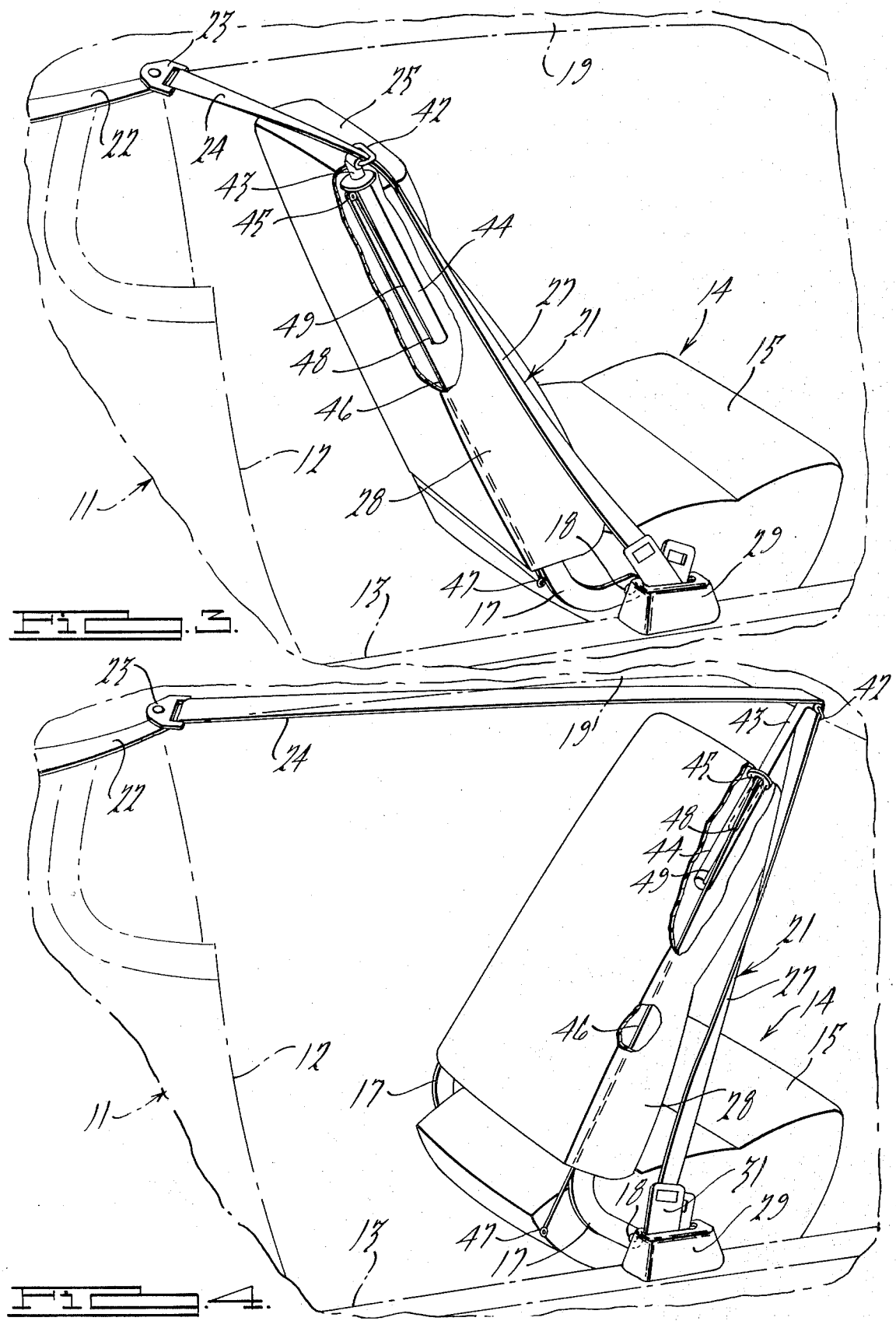

SEAT BELT POSITIONER

BACKGROUND OF THE INVENTION

U.S. Pat. No. 3,532,361 issued Oct. 6, 1970 to Thomas F. Hrynik refers to the necessity of making provision for the stowage of shoulder harness belt segments when not in use. A reason stated is that the anchoring points of the harness belt segments conventionally are located in the roof rail area of the body roof panel above the vehicle door openings. If the belt segments are not stowed when not in use, the conventional arrangement allows the belt segments to hang down into the door opening thereby to impeded access and egress to and from the vehicle passenger compartment. Such stowage is only feasible, however, when the shoulder harness segment can be disconnected from the lap belt segment of the passenger restraint system.

It appears that future motor vehicle safety regulations may require passenger restraint systems to be of the "must wear" type. That is, the buckle end of the shoulder harness must be permanently connected to the buckle end of the lap belt so that both must be worn to obtain the passenger restraint function. This means that the shoulder harness will always hang down into the door opening when the restraint system is not in use. The condition will be particularly acute in two-door vehicles in which the front seat backrest must be tilted forwardly to enlarge the ingress-egress passageway to the vehicle body compartment to the rear of the front seats.

It is an object of the present invention to provide a lift mechanism for raising the interfering segment of the shoulder harness toward the compartment roof, the mechanism being actuated by the tilting of the seatback in a direction to enlarge the passageway.

SUMMARY OF THE INVENTION

Shoulder harness positioning means in accordance with this invention are adapted for use in a motor vehicle having a body structure defining a passenger compartment and having a forward facing passenger seat assembly mounted within the compartment. The seat assembly comprises a backrest structure and a seat cushion structure with the backrest structure being tiltable about an axis adjacent the rear end of the seat cushion structure to provide an enlarged passageway for ingress and egress to the compartment space rearwardly of the seat assembly. The shoulder harness is adapted to cooperate with a lap belt to restrain a passenger in the seat assembly, the shoulder harness at its upper end being coupled to an anchor means located on the roof side rail above and rearwardly of the seat assembly. The shoulder harness in non-passenger restraining condition extends downwardly and forwardly from the anchor means across the space behind the backrest structure to an anchor means in juxtaposition to the seat cushion structure. The shoulder harness in non-restraining condition has a segment that interferes with access to the vehicle body space behind the seat assembly. To correct the interference condition, a lift means carried on the backrest structure is positioned to underlie the shoulder harness means. A drive means responsive to forward tilting movement of the backrest structure is operable to raise the lift means and thereby the segment of the shoulder harness causing the interference toward the roof side rail to an extended substantially parallel relationship to the latter out of interference with access to the vehicle body space behind the seat assembly.

DESCRIPTION OF THE DRAWINGS

Further features and advantages of the present invention will be made more apparent as this description proceeds, reference being had to the accompanying drawings, wherein:

FIG. 1 is a perspective view of a vehicle seat assembly in its relationship to a shoulder harness when the seat is unoccupied, in accordance with a first embodiment of the present invention;

FIG. 2 is a view in part similar to FIG. 1 illustrating a shoulder harness segment raised to the roof of the vehicle to facilitate ingress or egress to or from the vehicle body area behind the seat assembly;

FIG. 3 is a view in part similar to FIG. 1 illustrating a second embodiment of the invention; and FIG. 4 is a view of the second embodiment as it appears in belt-raised position.

DETAILED DESCRIPTION OF THE INVENTION

Referring now to the drawings, there is shown in FIGS. 1 and 2 in dot and dash outline a vehicle body, generally designated 11 having a door opening 12 and a floor structure 13. A seat assembly 14 is supported on the floor structure 13, the seat assembly 14 having a seat cushion structure 15 and a backrest structure 16 forwardly tiltable over the seat cushion structure 15. The backrest structure 16 is supported for tilting movement on hinge arms 17 pivoted on hinge pins 18 located near the rear end of the seat cushion structure 15.

A seat assembly such as a seat assembly 14 having a tiltable backrest structure 16 is conventionally used in a two-door sedan vehicle, the backrest structure 16 being forwardly tiltable to enlarge the ingress or egress passageway between the door pillar and the seat assembly leading to the vehicle body compartment space rearwardly of the seat. It has been found, however, that in vehicles equipped with passenger restraint or seat belt systems having a shoulder harness, the passageway to the rear may be obstructed by the shoulder harness which has a tendency to hang down into the door opening because of the location of its upper anchor point. Frequently, the hanging harness is avoided by not using the shoulder harness but leaving it folded against the side roof rail 19, as shown in U.S. Pat. No. 3,532,361. This can be done when the shoulder harness buckle element is disconnectable from the lap belt buckle element. It appears, however, that future safety regulations will require a non-disconnectable system so that the shoulder harness must be worn when the lap belt is worn and no provision will be made for roof side rail stowage.

As shown in FIG. 1, the shoulder harness, generally designated 21, has a first belt segment 22 which extends rearwardly to a roof rail mounted retractor (not shown) and forwardly through a swivelly mounted D-ring 23. The belt segment 24 forwardly of the D-ring extends downwardly and forwardly to the top 25 of the backrest structure 16. In a conventional arrangement, the belt segment 24 may pass through a fixed belt guide loop located on the top 25 of the backrest structure 16 near the outboard edge of the seat assembly. In the present embodiment, a belt guide loop, herein designated 26, is utilized but is movably supported on the backrest structure 16, as will be more fully explained. From the belt guide loop 26, the harness 21 has a belt segment 27 extending down the outboard side 28 of the backrest structure 16 to a retractor mechanism 29. The terminal end of the belt segment 27 is coupled to a non-detachable shoulder harness, lap belt (not visible) and D-ring assembly indicated at 31. As shown in FIG. 1, the intermediate shoulder harness segment 24 cuts across the passageway between the body pillar defining the rear edge of the door opening 12 and the backrest structure 16. If the backrest structure 16 is tilted forwardly to enlarge the passageway, the harness segment 24 becomes elongated and drops lower across the passageway in position to entangle a person seeking ingress or egress to or from the space in the compartment to the rear of the seat assembly 14.

In accordance with the present embodiment of the invention, a corner section of the backrest 16 is formed as a separate, upholstered, support unit 32 carrying the belt guide loop 26. Support unit 32 is connected to an elongated L-shaped lift member 33 having an upstanding leg portion 34 which passes through a guide bushing or grommet (not shown) in the upper surface 35 of the backrest structure 16 on which the support unit 32 is normally seated. The upstanding leg portion 34 of the lift member 33 is seated in and guided by the spaced walls 36–37 of a forwardly opening vertically elongated recess in the backrest structure outboard side panel 28.

The base leg 38 of the lift member is pivotally mounted at its terminal end 39 on the seat cushion frame by a pivot bolt 41. The pivot axis defined by the bolt 41 is forward of the backrest structure pivot axis 18. As a result, when the backrest structure is tilted forwardly, the base leg 38 functions as a drive means swinging the lift member forwardly and upwardly. The relative movement of the lift member 33 upper end carrying the support unit 32 is therefore upwardly toward the side roof rail 19 as it moves forwardly.

As the support unit 32 moves upwardly and forwardly, the shoulder harness segment 24 is elongated - the shoulder harness being unreeled from the retractor to the rear of the D-ring 23 - and is raised to a substantially horizontal relationship to and beneath the side roof rail 19 while the belt segment 27 retains substantial alignement with the seat backrest. Thus, as the passageway between the body pillar defining the rear edge of the door opening 12 and the seat backrest structure 16 is enlarged, the shoulder harness segment 24 is raised providing a substantially clear area therebeneath for access to or from the rear compartment space of the vehicle body.

In the embodiment of FIGS. 3 and 4, the belt guide loop comprises a ring 42 carried on the upper end of a lift member rod 43 telescopically housed within a slotted tube 44 mounted within the backrest structure 16. Fixed to the tube 44 near its upper end is a pulley 45 receiving a cable 46. The lower end of the cable 46 is anchored to the seat cushion structure at the rear end of the latter. The upper end of the cable 46 passes over the pulley and is anchored or connected to the lower end of the rod 43, the connection 48 being slidable in an axially extending slot 49 in the slotted tubular housing 44.

In operation, as the seat backrest structure is tilted forwardly the distance from the pulley 45 to the end 47 of the cable 46 lengthens causing the cable end 48 to move upwardly thereby raising the rod 43. The resultant movement of the belt guide loop ring 42 is forwardly because of the forward tilting of the seat backrest structure 16 and upwardly because of the raising of the rod 43, toward the side roof rail 19.

As in the operation of the previously described embodiment, the belt segment 24 also is elongated and raised to a substantially horizontal position beneath the vehicle body roof to provide clear access to the compartment rearwardly of the seat assembly 14.

It is to be understood this invention is not limited to the exact constructions illustrated and described above, but that various changes and modifications may be made without departing from the spirit and scope of the invention as defined by the following claims.

I claim:

1. In a vehicle body having a floor structure, a seat assembly mounted on the floor structure, and a roof side rail located above the outboard side of the seat assembly, the seat assembly having a seat cushion structure and a backrest structure forwardly tiltable over the seat cushion structure about a pivot axis located at the rear end of the latter, and a shoulder harness adapted to cooperate with a lap belt to restrain a passenger in the seat assembly, the shoulder harness at its upper end being coupled to a positioning means located on the roof side rail above and rearwardly of the seat assembly, the shoulder harness in non-passenger restraining condition extending downwardly and forwardly from the positioning means across the space behind the backrest structure to an anchor means in juxtaposition to the seat cushion structure, the shoulder harness in non-restraining condition interfering with access to the vehicle body space behind the seat assembly, wherein the improvement comprises:

lift means carried on the backrest structure coupled to the shoulder harness means, the lift means being responsive to forward tilting movement of the backrest structure to raise thereby a segment of the shoulder harness into substantially parallel relationship to and immediately below the roof side rail out of interference with access to the vehicle body space behind the seat assembly.

2. In a vehicle body according to claim 1, in which:

the lift means comprises an elongated leg portion of a substantially L-shaped member, the elongated leg portion extending up the outboard side of the backrest structure, and a shorter base leg portion of the substantially L-shaped member, the shorter leg portion extending normally forwardly along a base portion of the seat assembly, the terminal end of the base leg portion being pivotally supported on the seat assembly for pivotal movement about an axis located forwardly of the axis about which the backrest structure is tiltable whereby forward tilting movement of the backrest structure causes relative upward movement of the lift means.

3. In a vehicle body according to claim 1, in which:

the lift means comprises a rod member telescopically contained within a tubular housing within the backrest structure, and a drive means is coupled to the telescopically contained rod member to extend the latter relative to the housing.

4. In a vehicle body according to claim 3, in which:

the drive means comprises a cable and pulley means, the cable being anchored at one end to the seat cushion structure and at its other end to the rod member and being operable to raise the rod member upon the backrest structure being tilted forwardly.

5. Shoulder harness positioning means for use in a motor vehicle having body structure defining a passenger compartment and having a forward facing passenger seat assembly mounted within the compartment, the seat assembly having a backrest structure and a seat cushion structure with the backrest structure being tiltable about an axis adjacent the rear end of the seat cushion structure to provide an enlarged passageway to the compartment space rearwardly of the seat assembly, positioning means positioning a shoulder harness at its upper end on the body structure above and rearwardly of the seat assembly, the shoulder harness extending from its positioning means through a belt guide loop on top of the backrest structure adjacent the outboard side of the latter to a non-detachable connection with a lap belt coupled to a retractor mounted on the body structure at the outboard side of the seat assembly, a segment of the shoulder harness between the positioning means and the belt guide loop being angularly extended across the passageway to the compartment rear space thereby interfering with access to the latter, wherein the improvement comprises:

support means on the backrest structure to which the belt guide loop is attached, and lift means connected to the support means, the lift means being movable in response to forward tilting movement of the backrest structure to raise the support means, the segment of the shoulder harness above the backrest structure being extended and lifted to a substantially horizontal position above the backrest out of the passageway to the compartment rear space.

6. Shoulder harness positioning means according to claim 5, in which:

the support means comprises an upholstered cushion means fitted into a cut-away portion of the upper outboard corner of the backrest structure.

7. Shoulder harness positioning means according to claim 5, in which:

the lift means comprises a substantially L-shaped member having an elongated leg portion extending up the outboard side of the backrest and a shorter base leg portion extending normally forwardly alongside a base portion of the seat assembly, the terminal end of the base leg portion being pivotally supported on the seat assembly for pivotal movement forwardly of the axis about which the backrest is tilted whereby forward tilting movement of the backrest causes relative upward movement of the lift means.

8. Shoulder harness positioning means according to claim 5, in which:

the lift means comprises a rod member telescopically contained within a tubular housing within the backrest, and a cable and pulley means, the cable being anchored at one end to the seat cushion structure and at its other end after passing over the pulley to the rod member and being operable to extend the rod member from the tubular housing upon the backrest structure being tilted forwardly.

* * * * *